United States Patent [19]

Mori et al.

[11] Patent Number: 4,870,403

[45] Date of Patent: Sep. 26, 1989

[54] PAGING RECEIVER WITH A CAPABILITY OF RECEIVING OR INHIBITING MESSAGE DATA

[75] Inventors: Toshihiro Mori; Takashi Oyagi, both of Tokyo, Japan

[73] Assignee: NEC Corporation, Japan

[21] Appl. No.: 35,348

[22] Filed: Apr. 7, 1987

[30] Foreign Application Priority Data

Apr. 12, 1986 [JP] Japan ................................. 61-83238

[51] Int. Cl.$^4$ .............................................. H04Q 7/00
[52] U.S. Cl. ...................... 340/825.440; 340/825.480; 340/825.470
[58] Field of Search ....................... 340/825.44, 825.48, 340/825.27, 825.22, 825.32; 379/57, 63; 358/114; 380/23

[56] References Cited

U.S. PATENT DOCUMENTS

| | | | |
|---|---|---|---|
| 4,626,845 | 12/1986 | Ley .................................. | 340/825.48 |
| 4,677,434 | 6/1987 | Fascenda ........................ | 340/825.26 |
| 4,706,272 | 11/1987 | Nishimura, et al. ............ | 340/825.44 |
| 4,736,421 | 4/1988 | Morita et al. ................... | 340/825.32 |

*Primary Examiner*—Donald J. Yusko
*Assistant Examiner*—E. O. Pudpud

*Attorney, Agent, or Firm*—Laff, Whitesel, Conte & Saret

[57] ABSTRACT

A paging receiver is capable of receiving message data. The receiver includes a data set and a hold circuit, the output logic of which is inverted in response to the detection of a control signal which follows a paging number individually assigned to that receiver. The receiver is inhibited and excluded from or enabled and restored into a data service which is provided in response to a common or group call number for paging many and unspecified receivers. The inhibit or enable signal is provided by the output of the data set and hold circuit. The data set and hold circuit are powered by a power source which is different from a main power source of the receiver. The receiver determines whether or not the power source associated with the data set and hold circuit is present and, if it is not present, the receipt of the data service based on the common number is inhibited. To eliminate malfunctions due to static electricity, a train of pulses is used as a control signal which follows a paging signal assigned to the individual receiver. The data set and hold circuit responds to means for sensing the pulse train, whereby the receipt of the date service which is based on the common number is inhibited or recovered by an output of the data set and hold circuit.

12 Claims, 6 Drawing Sheets

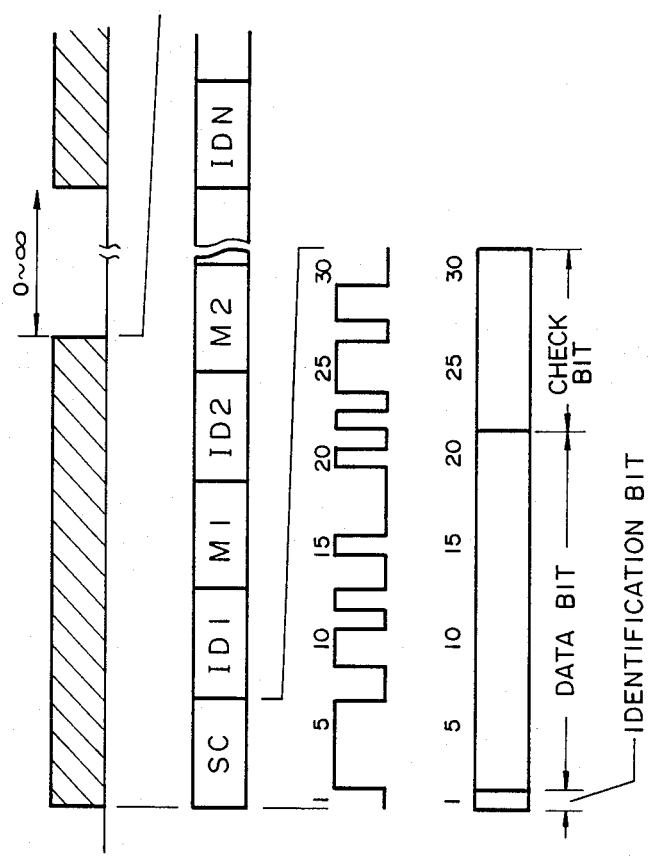

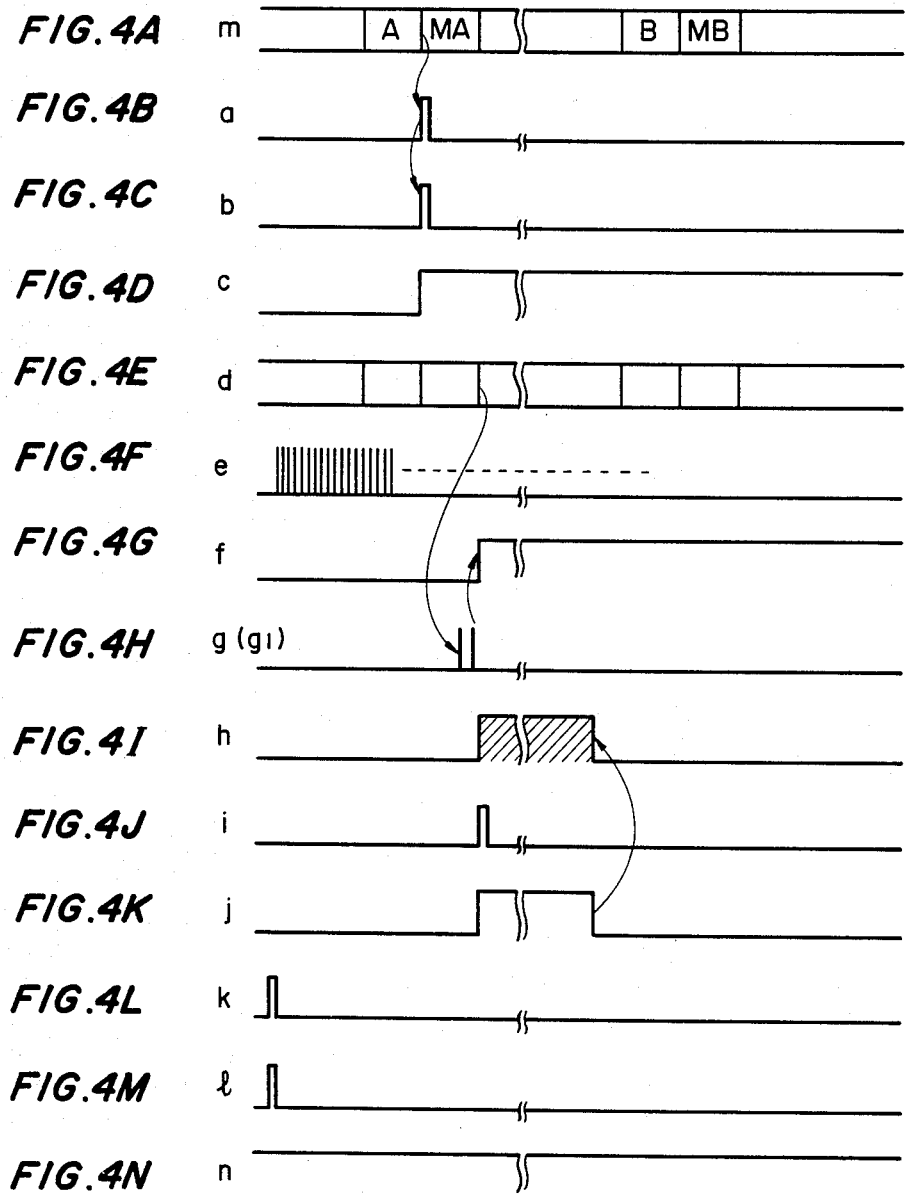

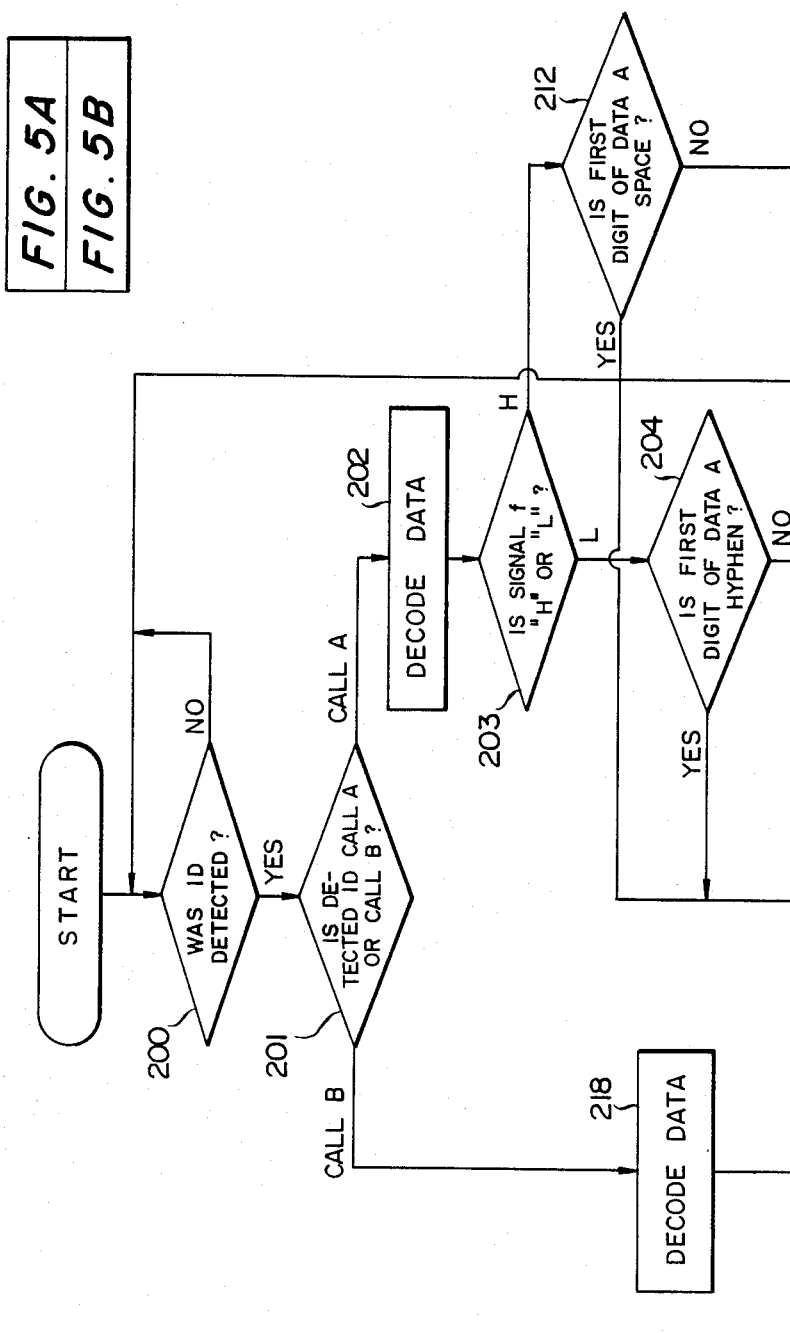

PAGING RECEIVER WITH A CAPABILITY OF RECEIVING OR INHIBITING MESSAGE DATA

BACKGROUND OF THE INVENTION

The present invention relates to a paging receiver having a capability of receiving message data.

The recent development in the electronics art has accelerated the trend toward a miniature and high performance paging receiver. Indeed, a paging receiver which is furnished not only with a simple paging function but also with a message data receiving function is presently on the market and extensively used in the data services industry. Popularization of data services, however, brings about a problem of the supply of valuable information even to those receivers which are delinquent in payment. In the light of this, there has been proposed a paging communication system in U.S. patent application Ser. No. 697,334, U.K. Patent Application No. GB 2 154 347A, and Canadian Patent Application Serial No. 473,573 which are based on Japanese Patent Application No. 59-24337/1984 as filed by NEC Corporation. The paging communication system proposed is configured so that a plurality of receivers are called in group in response to a paging signal transmitted from a base station. The base station transmits to an individual receiver a control signal adapted to inhibit the receipt of message data or cancel the inhibition. The control is added to a paging number particular to the receiver while the message data in question is transmitted after a calling number (common address number) that is meant for many and unspecified receivers.

However, such a system has a drawback that once a battery or like power source installed in the receiver is removed, the inhibition of the receipt of the message data is cancelled allowing even a receiver in delinquency to receive message data again. Further, the prior art system is susceptible to noise because a detection pulse adapted for the inhibition of the receipt of message data and the cancellation of the inhibition is implemented with only a single bit, i.e., logical ONE or ZERO.

SUMMARY OF THE INVENTION

It is therefore an object of the present invention to provide a paging receiver with a capability of receiving message data which makes it possible for a base station to exclude a delinquent receiver from a data service and to restore it into the data service, each over a radio link.

It is another object of the present invention to provide a generally improved paging receiver with a capability of receiving message data.

A paging receiver having a capability of receiving message data on reception of a first calling number which is assigned to the receiver and a second calling number which is adapted for a data service for many and unspecified paging receivers of the present invention comprises detecting means for detecting a predetermined pattern which is contained in message data that is added to the first calling number, and control means responsive to a control signal from the detecting means for controlling at least a data service which corresponds to the second calling number the control means comprising at least a first power source which is different from a main power source of the receiver, a hold circuit for inverting and holding an output logic of the hold circuit in response to the control signal.

Another paging receiver of the present invention comprises a message receiver for receiving messages following a first identification number which is assigned to the paging receiver and a second identification number which is assigned to a plurality of paging receivers inclusive of the paging receiver, a detector for detecting a predetermined pattern which is contained in a message following the first identification number to produce a control signal, and a controller responsive to the control signal for controlling the reception of a message which follows the second identification number. The controller is energized by a first power source which is separate from a main power source of the paging receiver.

A method of controlling the reception of a message following a common call number which is assigned to a plurality of paging receivers inclusive of a given paging receiver of the present invention the steps of receiving messages following the common call number and an individual call number which is assigned to the given paging receiver, detecting a predetermined pattern which is contained in a message following the individual call number to produce a control signal, holding the control signal irrespective of the removal of a main power source of the given paging receiver, and responsive to the held control signal, controlling the reception of a message following the common call number.

The above and other objects, features and advantages of the present invention will become more apparent from the following detailed description taken with the accompanying drawings.

BRIEF DESCRIPTION OF THE DRAWINGS

FIGS. 3A to 3D are diagrams showing the formats of signals which are applicable to the paging receiver of the present invention;

FIGS. 4A to 4N are timing charts representative of exemplary waveforms which appear in various portions of FIGS. 1 and 2; and FIGS. 5 5A and 5B represent and show a flowchart demonstrating a basic routine which is excuted by a central processing unit as shown in FIG. 1.

DESCRIPTION OF THE PREFERRED EMBODIMENT

Figure 1:
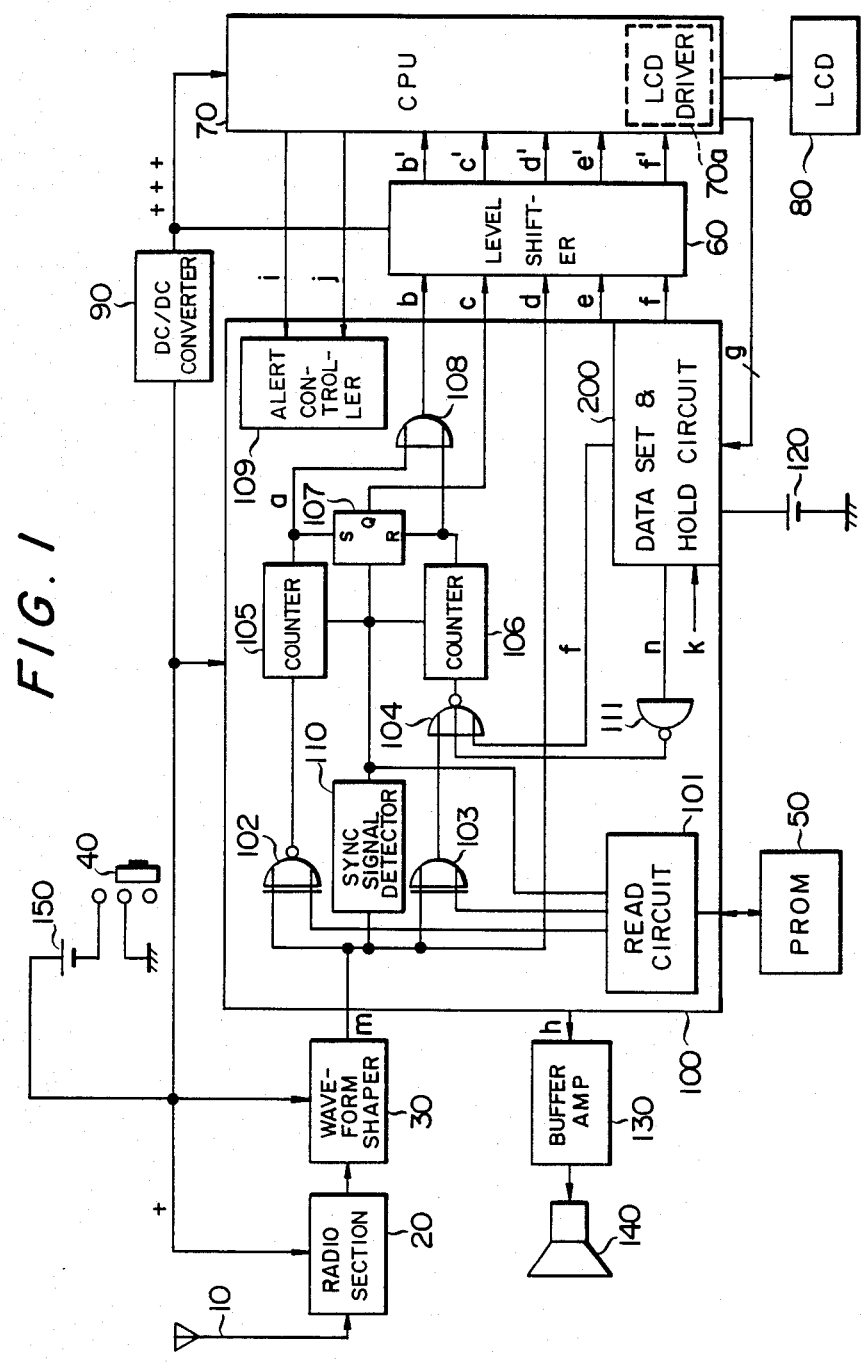
FIG. 1 is a block diagram showing a paging receiver embodying the present invention.

Referring to FIG. 1 of the drawings, a paging receiver with a capability of receiving message data embodying the present invention is shown. As shown, a radio signal coming in through an antenna 10 is amplified, detected and demodulated by a radio section 20 and, then, converted by a waveform shaper 30 into a digital signal. A decoder 100 compares the digital signal with a plurality of own calling numbers which are stored in an erasable read only memory (PROM) 50, as will be described later, informing a central processing unit (CPU) 70 of the receipt of a call via a level shifter 60. A liquid crystal display (LCD) driver 70a is built in the CPU 70 in order to drive an LCD 80.

While a switch 40 of the receiver is ON, voltage from a battery 150 is applied to the radio section 20, waveform shaper 30 and decoder 100 and, at the same time, to the level shifter 60 and CPU 70 via a DC/DC converter 90.

The decoder 100 comprises a read circuit 101 for reading data out of the PROM 50, an Exclusive-NOR (EX-NOR) gate 102, an Exclusive-OR (EX-OR) gate 103, a NOR gate 104, counters 105 and 106, an SR flip-flop 107, an OR gate 108, an alert controller 109, a synchronizing signal detector 110, an inverter 111, and a data set and hold circuit 200 which constitutes a characteristic feature of the present invention.

When the alert controller 109 is enabled, an alarm horn 140 is driven via a buffer amplifier 130. A battery 120 is connected to the data set and hold circuit 200.

In this particular embodiment, two calling numbers are stored in the PROM 50 as the previously mentioned receiver calling numbers, one of them being referred to as a call A and the other as a call B hereinafter. While the call A is representative of a paging number which is assigned to an individual receiver, the call B is representative of a common number which is commonly assigned to respective receivers.

Figure 2:
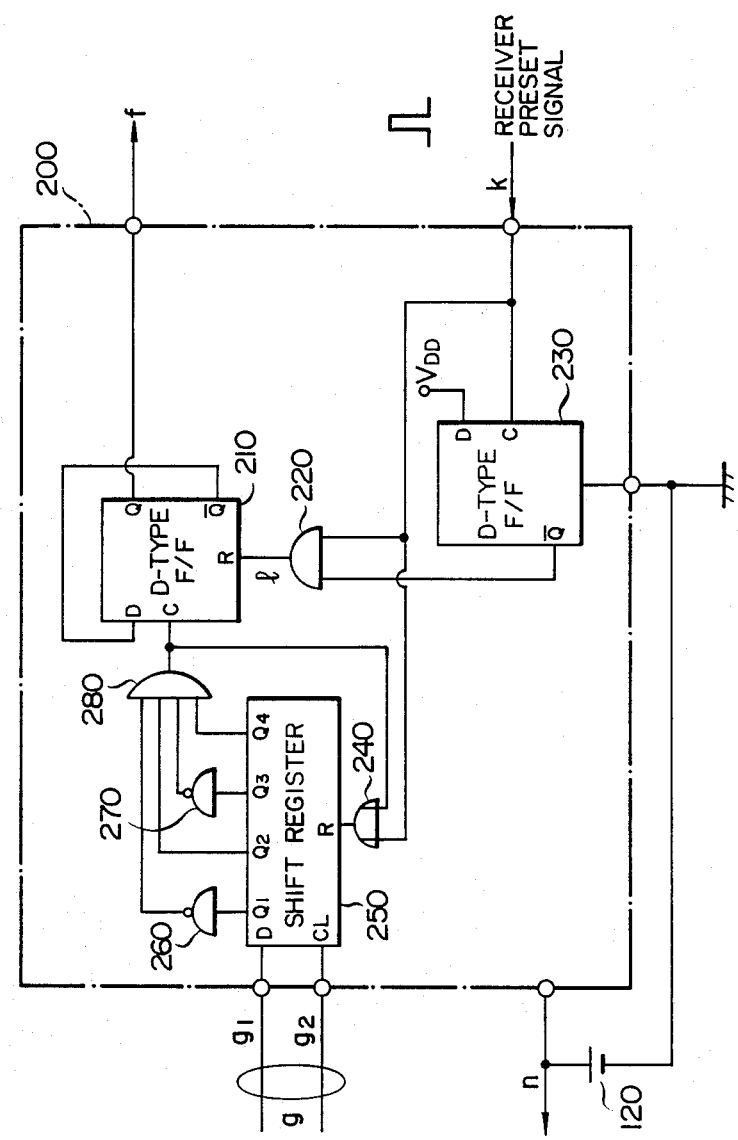
FIG. 2 is a diagram showing a specific construction of a data set and hold circuit which is included in the receiver of FIG. 1.

Referring to FIG. 2, a specific construction of the data set and hold circuit 200 of FIG. 1 is shown. In this example, the circuit 200 is shown as comprising a D type flip-flop 210, an AND gate 220, a D type flip-flop 230, an OR gate 240, a shift register 250, inverters 260 and 270, and an AND gate 280.

FIGS. 3A to 3D show signal formats which are applicable to this particular embodiment. Specifically, FIG. 3B shows the format of a transmit signal which is made up of a synchronizing signal SC, identification signals ID1, ID2, . . . , IDN, and message signals M1, M2, . . . As shown in FIG. 3C, the synchronizing signal SC may have a pattern of "0111110011010010000101011101100." FIG. 3D shows a word which is applicable to both of the identification signals and the message signals. An identification signal and a message signal are discriminated from each other based on an identification bit, or most significant bit (MSB); when the MSB is (logical) ZERO, it indicates that the signal which follows it is an identification signal ID1, ID2, . . . and, when it is ONE, it indicates that the following signal is a message signal M1, M2, . . . The word has a format of BCH (Bose-Chaudhuri Hocquenghem) (31, 21) which is comprised of twenty one data bits (bits 1 to 21), and ten check bits (bits 22 to 31).

Waveforms of signals which appear in various portions of FIGS. 1 and 2 are shown in a timing chart in FIGS. 4A to 4N. The basic routine to be executed by the CPU 70 is shown in a flowchart in FIG. 5.

In operation, a demodulated wave outputted by the radio section 20 is shaped by the waveform shaper 30 as shown in FIG. 3B and, then, fed to the decoder 100. Assume that, as shown in FIG. 4A, the calls A and B are transmitted as a signal m with message data MA and MB respectively added thereto. As soon as the synchronizing signal detector 110 detects a synchronizing signal, the read circuit 101 and the counters 105 and 106 are preset to prepare for the subsequent detection of an identification signal. The calls A and B which are stored in the PROM 50 are read out by the read circuit 101 and applied to, respectively, the EX-NOR gate 102 and the EX-OR gate 103 serially on a bit-by-bit basis together with patterns which correspond to the calls A and B, whereby the data read out are compared with the received data bit by bit.

When the detection of the call A is confirmed by the above procedure, as represented by a signal a in FIG. 4B, the SR flip-flop 107 is set with the signal a fed to the OR gate 108. As a result, a calling signal detect signal b, FIG. 4C, and a received call identify signal c, FIG. 4D, are delivered to the CPU 70 via the level shifter 60. When detected a level shifted signal b', the CPU 70 decides that a calling signal has been detected (Yes, step 200 of FIG. 5) and, then, determines the logical level of a level shifted signal c' (step 201). As represented by a signal c in FIG. 4D, when the CPU 70 identifies a (logical) high level, or "H", it determines that a call A has been detected (CAll A, step 201) and, in response to a clock e, FIG. 4F, which is fed thereto from the decoder 100 and synchronized with received data d, FIG. 4E, decodes the subsequent message data out of the received data d (step 202).

Subsequently, the CPU 70 checks the output f, FIG. 4G, of the data set and hold circuit 200 (step 203). When determined that the signal f is low level, or "L" (L, step 203), meaning that the receiver is qualified to receive the service based on the common number, the CPU 70 examines the first digit of the received data (steps 204 and 205). If the first digit is "1100" (Yes, step 205) which is representative of a space, as shown in table 1 below, the CPU 70 restores the receiver to an ordinary standby condition and, then, returns to the step 200.

TABLE 1

| BCD CODE | CHARACTER DISPLAYED |
|---|---|
| 0 0 0 0 | 0 |
| 0 0 0 1 | 1 |
| 0 0 1 0 | 2 |
| 0 0 1 1 | 3 |
| 0 1 0 0 | 4 |
| 0 1 0 1 | 5 |
| 0 1 1 0 | 6 |
| 0 1 1 1 | 7 |
| 1 0 0 0 | 8 |
| 1 0 0 1 | 9 |
| 1 0 1 0 | E |
| 1 0 1 1 | U |
| 1 1 0 0 | (SPACE) |
| 1 1 0 1 | — |
| 1 1 1 0 | [ |
| 1 1 1 1 | ] |

If the first digit is "1101" (Yes, step 204) representative of a hyphen, as shown in Table 1, the CPU 70 sets an alert designate signal j, FIG. 4K, to the logic of call A (i.e. high level) (step 206) while producing an alert control signal i, FIG. 4J, (step 207). In response to the signals i and j, the alert controller 109 delivers an output h thereof to the buffer amplifier 130 so as to drive the alarm horn 140. Further, the CPU 70 produces a signal g, FIG. 4H, (step 208). Then, the CPU 70 increments N (step 209) and determines if the resultant N is odd (step 210). Because the initial value of N is zero, the resultant N mentioned above is odd (Yes, step 210) so that the CPU 70 produces on the LCD 80 a message which notifies the user of the end of the information service available, "OUT SERVICE" in this particular embodiment (step 211).

In the data set and hold circuit 200, the output of the D type flip-flop 210 is inverted by the signal g. As shown in FIG. 2, the signal g consists of a component $g_1$ which is representative of a pattern of "1010", and a component $g_2$ representative of four-bits of clock corresponding to the component $g_1$. In the above condition, the call B signal with the message data MB, m in FIG. 4A, is applied to the EX-OR gate 103 to be compared bit by bit with the call B data which is stored in the PROM 50. However, because the output of the EX-OR gate 103 has been inhibited by the control signal f which has been applied to the NOR gate 104, the call B is not received (FIGS. 4C and 4D).

Figure 5B:
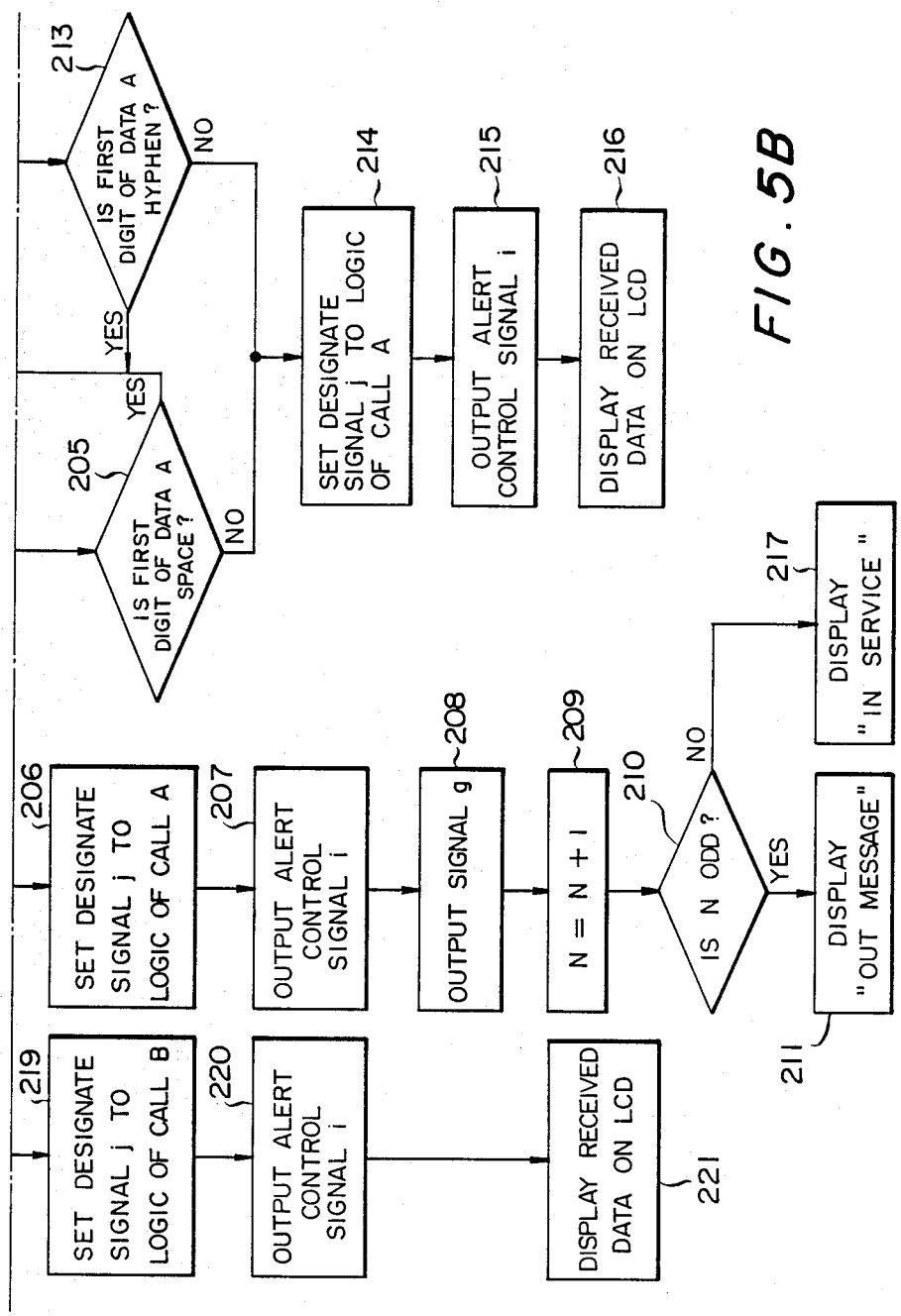

Next, upon detection of the receipt of a call A, because the signal f is high level, or "H", the CPU 70 sets the alert designate signal j to the logic of call A (step 214) if the first digit of the message data is neither a space nor a hyphen (No, step 212 and No, step 213), as seen from FIG. 5. At the same time, the CPU 70 delivers the alert control signal j (step 215) to enable the alert controller 109. Consequently, the alarm horn 140 is driven via the buffer amplifier 130, and received data is produced on the LCD 80 (step 216). If the first digit is a hyphen (Yes, step 213), the receiver is restored to the standby condition making no response, the program returning to the step 200. Further, if the initial digit is a space (Yes, step 212), the CPU 70 sets the alert designate signal j to the logic of call A (step 206), delivers the alert control signal i (step 207) to sound the receiver, and produces the signal g (step 208) to invert the logic of the D type flip-flop 210 which is built in the data set and hold circuit 200. Thereupon, the CPU 70 increments N by one (step 209) and, because the resultant N is even (No, step 210), it displays a message "IN SERVICE" on the LCD 80 to show the user that the receiver is qualified for the service (step 217).

Under the above condition, as a message associated with the call B is detected (CALL B, step 201), the CPU 70 decodes the subsequent message data out of the received data (step 218), sets the alert designate signal j to the logic of call B (step 219), produces the alert control signal i (step 220) to sound the receiver, and produces the received message data on the LCD 80 (step 221).

In this particular embodiment, when the user of the receiver intentionally removes the battery 120 which is to power the data set and hold circuit 200, a power signal n is fed via the inverter 111 to the NOR gate 104. In this construction, on the removal of the battery 120, the signal n becomes low level, or "L", to disable the NOR gate 104 and, thereby, prevents the receiver from sensing a call B.

As described above, a paging receiver in accordance with the present invention is provided with a data set and hold circuit which is responsive to the detection of a predetermined control signal and driven by a different power source from one adapted to drive the receiver, the operation of the receiver being controlled by an output of the data set and hold circuit. This allows a radio base station to end and resume over a radio link data services for those receivers which are in delinquency, contributing a great deal to the efficient management of data supply services.

Various modifications will become possible for those skilled in the art after receiving the teachings of the present disclosure without departing from the scope thereof.

What is claimed is:

1. A paging receiver having a capability of receiving message data on reception of a first calling number which is assigned to said receiver and a second calling number which is adapted for a data service for many and unspecified paging receivers, said paging receiver comprising:
   detecting means for detecting a predetermined pattern which is contained in message data that is added to said first calling number; and
   control means responsive to a control signal from said detecting means for controlling at least a data service which corresponds to said second calling number;
   said control means comprising at least a first power source which is different from a main power source of the receiver and a hold circuit for inverting and holding an output logic of said hold circuit in response to said control signal.

2. A paging receiver as claimed in claim 1, wherein the control signal comprises a train of pulses.

3. A paging receiver as claimed in claim 2, wherein the hold circuit comprises a decoder for decoding the train of pulses.

4. A paging receiver as claimed in claim 1, wherein the control means uses as the control signal at least a signal which is representative of presence/absence of the first power source.

5. A paging receiver as claimed in claim 1, wherein the predetermined pattern comprises at least a first pattern for ending the data service which corresponds to the second calling signal, and a second pattern for resuming the data service for a paging receiver which was excluded from said service.

6. A paging receiver as claimed in claim 5, wherein the detecting means delivers the control signal on receipt of said first pattern, the control means comprising means for ending the data service which corresponds to the second calling signal, in response to said control signal.

7. A paging receiver comprising:
   means for receiving messages following a first identification number which is assigned to said receiver and a second identification number which is assigned to a plurality of paging receivers inclusive of said receiver;
   means for detecting a predetermined pattern which is contained in a message following said first identification number to produce a control signal; and
   control means responsive to said control signal for controlling the reception of said second identification number, said control means being energized by a first power source which is separate from a main power source of said receiver.

8. A paging receiver as claimed in claim 7, wherein said control signal comprises a train of pulses.

9. A paging receiver as claimed in claim 8, wherein said control means comprises a decoder for decoding said train of pulses to produce said control signal, and a hold circuit for holding said control signal from said decoder.

10. A paging receiver as claimed in claim 7, wherein said control means comprises means responsive to the removal of said first power source for inhibiting the reception of a message which follows said second identification number.

11. A paging receiver as claimed in claim 7, wherein said predetermined pattern comprises first and second patterns, wherein said detecting means comprises means for detecting said first and second patterns to produce first and second control signals, respectively, and wherein said control means inhibits the reception of said second identification number in response to said first control signal and releases the inhibition of said reception of the message in response to said second control signal.

12. A method of controlling the reception of a message following a common call number which is assigned to a plurality of paging receivers inclusive of a given paging receiver, comprising the steps of:

receiving messages following said common call number and an individual call number which is assigned to said given paging receiver;

detecting a predetermined pattern which is contained in a message following said individual call number to produce a control signal;

holding said control signal irrespective of the removal of a main power source of said given paging receiver; and responsive to the held control signal, controlling the reception of said common call number.

* * * * *